US006981277B1

(12) United States Patent
Smith

(10) Patent No.: US 6,981,277 B1
(45) Date of Patent: Dec. 27, 2005

(54) APPARATUS AND METHOD FOR CONDUCTING NON-AUTHENTICATION TASK USING WORKSTATION AUTHENTICATION SYSTEM

(75) Inventor: Dylan Smith, League City, TX (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 09/709,839

(22) Filed: Nov. 10, 2000

(51) Int. Cl.[7] ................................................ H04L 9/00
(52) U.S. Cl. ................................ 726/2; 726/3; 713/168
(58) Field of Search ............................... 713/183, 200, 713/201; 705/57, 58; 709/201, 224, 225

(56) References Cited

U.S. PATENT DOCUMENTS

| | | | |
|---|---|---|---|
| 4,724,521 A | 2/1988 | Carron et al. | |
| 5,444,850 A | 8/1995 | Chang | |
| 5,680,547 A | 10/1997 | Chang | |
| 5,742,829 A | 4/1998 | Davis et al. | |
| 5,764,992 A | 6/1998 | Kullick et al. | |
| 5,781,724 A | 7/1998 | Nevarez et al. | |
| 5,805,897 A | 9/1998 | Glowny | |
| 5,809,251 A | 9/1998 | May et al. | |
| 5,809,287 A | 9/1998 | Stupek, Jr. et al. | |
| 5,826,015 A | 10/1998 | Schmidt | |
| 5,881,236 A | 3/1999 | Dickey | |
| 6,009,274 A * | 12/1999 | Fletcher et al. ............. | 717/173 |
| 6,035,423 A * | 3/2000 | Hodges et al. ............. | 714/38 |
| 6,075,943 A | 6/2000 | Feinman | |
| 6,178,511 B1 * | 1/2001 | Cohen et al. ............... | 713/201 |
| 6,418,555 B2 * | 7/2002 | Mohammed ................ | 717/169 |
| 6,421,768 B1 * | 7/2002 | Purpura ...................... | 711/164 |
| 6,421,781 B1 * | 7/2002 | Fox et al. ................... | 713/201 |
| 6,473,099 B1 * | 10/2002 | Goldman et al. .......... | 715/749 |

FOREIGN PATENT DOCUMENTS

| | | |
|---|---|---|
| JP | 63-182743 | 7/1988 |
| JP | 05-158703 | 6/1993 |
| JP | 10-149326 | 6/1998 |
| WO | WO 97/37475 | 10/1997 |

OTHER PUBLICATIONS

IBM Technical Disclosure Bulletin, vol. 39, No. 11, Nov. 1996, pp. 139-144.

* cited by examiner

*Primary Examiner*—Kambiz Zand
(74) *Attorney, Agent, or Firm*—Norman Gundel; Hoffman, Warnick & D'Alessandro LLC

(57) ABSTRACT

An apparatus and method for conducting non-authentication tasks using an authentication system of a workstation. A task module configured to conduct a non-authentication task is loaded to an authentication system. The invention finds advantageous use relative to upgrades in that the task module may be configured to conduct a userless logon of a workstation and display messages even though no user is signed on to the workstation. The task module may also be configured to receive responses to the messages.

25 Claims, 7 Drawing Sheets

APPARATUS AND METHOD FOR CONDUCTING NON-AUTHENTICATION TASK USING WORKSTATION AUTHENTICATION SYSTEM

BACKGROUND OF THE INVENTION

1. Technical Field

The present invention relates generally to workstation authentication, and more particularly to an apparatus and method for conducting a non-authentication task using a workstation authentication system.

2. Related Art

In today's computer network environment, upgrades of applications resident on a network can be very time consuming and labor intensive. The reason for this is that network environments often use operating systems such as Microsoft Windows NT® or UNIX that require manual attention to each workstation, i.e., clients, to complete upgrades. To lessen the burden of these upgrades, centralized upgrade systems for upgrading numerous workstations have been developed. Unfortunately, each workstation, in many instances, still requires manual attention to complete the upgrade. One reason for this is that the authentication system of many network environment operating systems, e.g., Microsoft Windows NT®, usually require a reboot or, at the very least, a login/logoff of each workstation before the additional functionality of the upgrade is available.

In addition, upgrade problems arise because of the inability of current systems to conduct an upgrade, or communicate with a workstation during an upgrade, if a user is not signed on to the workstation.

A part of every network environment operating system is an authentication system. Mechanisms have been developed to provide for a single logon to be authenticated in many different pieces of software, relieving the user from having to sign-on multiple times to different systems/software. For example, Microsoft Windows NT® allows a replacement of its authentication system's graphical identification and authentication (GINA) module to modify the default behavior of the NT authentication services. U.S. Pat. No. 5,781,724 to Nevarez et al. entitled "Method and System for Integrating Additional Functionality Into a Login System," which is hereby incorporated by reference, discloses an event driven method for adding functionality to an authentication system is described. However, these mechanisms do not address the need in the art to modify an authentication system such that non-authentication related tasks, such as those necessary to complete an upgrade, can be provided. Furthermore, these systems do not allow modification of the authentication system at runtime.

In view of the foregoing, there is a need in the art for an apparatus for conducting non-authentication tasks using a workstation authentication system. In particular, there is a need for an apparatus that can conduct non-authentication tasks related to upgrades. It would be advantageous if such an apparatus had the ability to modify the authentication system at runtime without requiring a reboot, e.g., add new function to the user authentication step without interrupting other workstation activity. Furthermore, the ability to initiate a userless workstation logon and allow operation of non-authentication tasks tailored to different upgrades or installations without overburdening memory would be helpful. A userless workstation logon would also remove the need for manual attention to complete an upgrade. An apparatus that could then log off and/or reboot the workstation would also be beneficial. The ability to display a message while no user is signed on, or after a user signs off/reboots, is also helpful to warn users not to use the workstation when it would interfere with an upgrade. Even further, the ability to receive a response to the above messages, e.g., provide a response to the next user who sees the message after an event occurs, would be advantageous. Finally, it would be advantageous if a remote program or system could request that the above-described functions be carried out.

SUMMARY OF THE INVENTION

The present invention provides an apparatus and method for conducting a non-authentication task using a workstation authentication system. The present invention finds special advantage relative to upgrades.

In a first general aspect of the invention, a method is provided for conducting non-authentication tasks using an authentication system of a workstation, comprising the steps of: loading a task module to the authentication system of the workstation; and conducting a non-authentication task using the task module.

In a second general aspect, a computer program product is provided comprising a computer useable medium having computer readable program code embodied therein for conducting non-authentication tasks using an authentication system of a workstation, the computer program product comprising: a task module configured to conduct a non-authentication task; and a task module loader configured to load the task module to the authentication system of the workstation.

In a third aspect of the invention a workstation is provided comprising a processor; memory having a software program stored therein, and executable by the processor, the software program including: an authentication system, a task module configured to conduct a non-authentication task using the authentication system, a task module loader resident in the authentication system configured to load the task module, and a requester configured to instruct the task module loader to load the task module and to instruct the authentication system how to activate the task module.

The invention aspects summarized above provide the ability to modify a workstation authentication system at runtime without requiring a reboot. Additionally, non-authentication tasks may include displaying a message from a requester, e.g., an upgrade system or program, and may also include sending a response to the message from a user of the workstation. In this way, a workstation may receive a variety of useful messages regarding an upgrade even when no user is signed on. Another preferable non-authentication task includes initiating a userless workstation logon so that upgrade progress indications may be shown in a way that does not require large additions to the authentication system itself. The above non-authentication tasks may also be combined.

The invention is also capable of providing the above functions in a fashion that is tailored to each upgrade by placing each function into a separate library that can be loaded and unloaded at any time without needing to reboot the workstation and regardless of whether a user is signed on. Further, the loading/unloading is completely invisible to a user of the workstation. When an upgrade is required, the system can command either from a remote computer or the workstation to load and start the code module that handles the login requirements of the update.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

For organizational purposes only, the disclosure includes the following headings:
I. Overview-
II. Workstation
III. Requester and Requester System
IV. Task Module
V. Operation
   A. Authentication System: Task Module Loader
   B. Task Module: Logon System
   C. Task Module: Display System
   D. Task Module: Other Task System(s)
   E. Authentication System: Reboot System
VI. Exemplary Use Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

I. Overview

Figure 1:
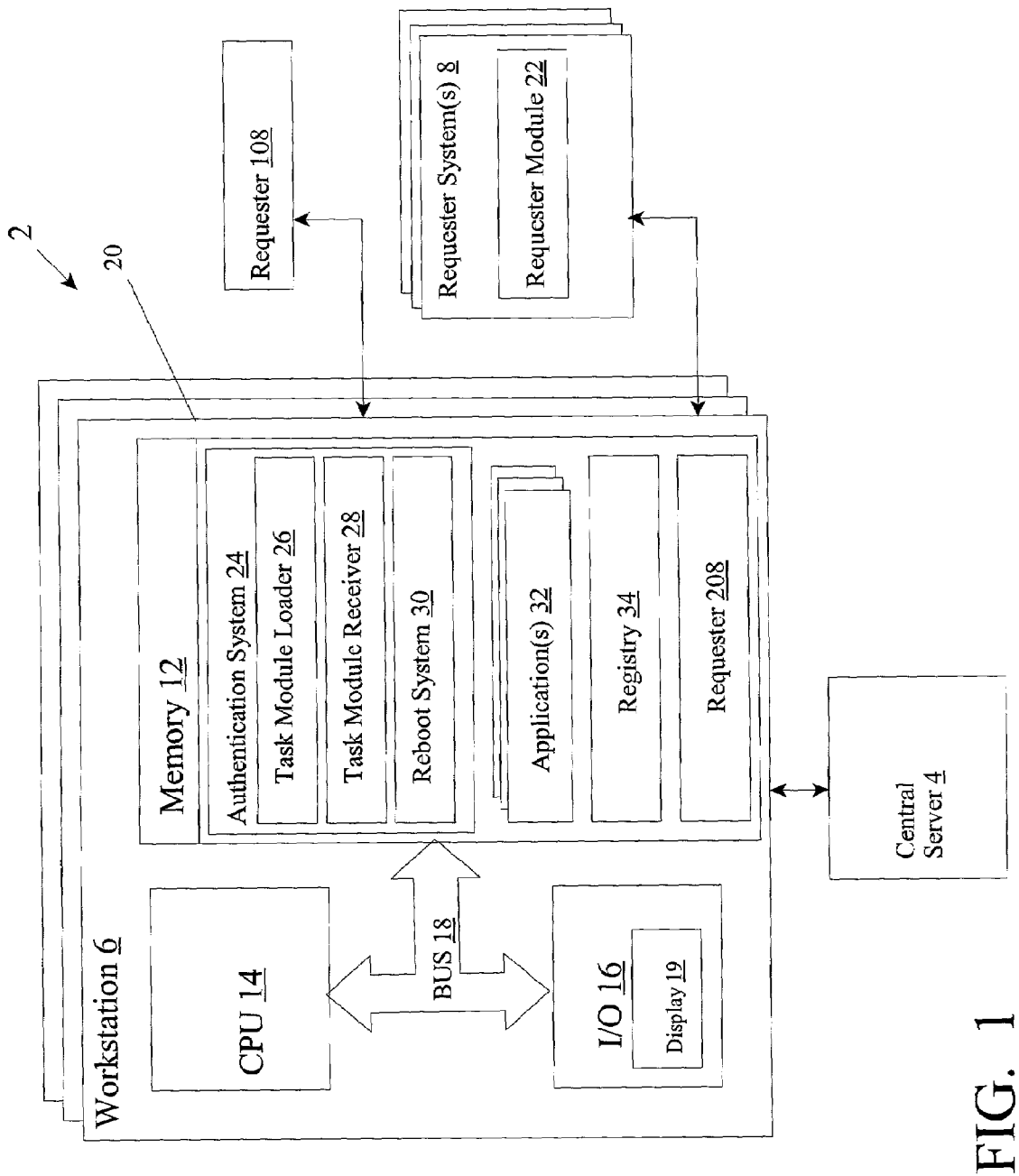
FIG. 1 is a block diagram of a network environment in accordance with the invention.

FIG. 1 is a block diagram of a client-server network environment 2 in accordance with a preferred embodiment of the present invention. In environment 2, a central server computer 4 is networked to one or more local systems or workstations 6, e.g., via local area networks (LAN), wide area networks (WAN), etc. Requester systems 8 or requesters 108 may also be networked to workstations 6. Each workstation 6 is preferably a computer system that uses an operating system such as Microsoft Windows NT®. As is known in the art, upgrades of workstations 6 are commonly provided to improve system performance, provide new functionality, etc. Since the present invention finds advantageous use relative to upgrades, the disclosure will be explained as if requesters 108, 208 and requester system 8 comprise upgrade programs or systems.

Each requester 8, 108, 208 have the ability to conduct non-authentication tasks using a task module 10 (FIG. 2) that is loadable to an authentication system 24 of a workstation 6. Exemplary non-authentication tasks that are helpful relative to upgrades include: the ability to perform automated userless logons so that upgrades can be run as if a user had manually performed these steps; and the ability to display messages on a sign-on screen of a workstation and obtain a response from a user who sees the message. It should be recognized, however, that the present invention may find advantageous use relative to other non-authentication tasks now known or later developed and, therefore, should not be limited to any particular use.

While each client and server of environment 2 preferably include similar computer components, e.g., memory, central processing unit (CPU), input/output devices (I/O), necessary buses, for brevity sake, the components of these systems will be described only in terms of workstation 6. However, the description that follows is equally applicable to each client and server of environment 2.

Workstation 6 preferably includes a memory 12, a central processing unit (CPU) 14, input/output devices (I/O) 16 and a bus 18. Memory 12 preferably includes a program product 20 that, when executed by CPU 14, comprises various functional capabilities described in further detail below. Memory 12 may comprise any known type of data storage system and/or transmission media, including magnetic media, optical media, random access memory (RAM), read only memory (ROM), a data object, etc. Moreover, memory 12 may reside at a single physical location comprising one or more types of data storage, or be distributed across a plurality of physical systems. CPU 14 may likewise comprise a single processing unit, or a plurality of processing units distributed across one or more locations. I/O 16 may comprise any known type of input/output device including a network system, modem, keyboard, mouse, voice recognition system, CRT, printer, disc drives, etc. One preferred I/O 16 of workstation 6 is a display 19. Additional components, such as cache memory, communication systems, system software, etc., may also be incorporated into workstation 6.

In a preferred embodiment, workstation 6 is a personal computer. However, as recognized in the field, workstation 6 may be networked to one or more central computers, i.e., servers. Relative to computer systems such as central server 4 and/or a requester system 8, the use of one or more servers is especially advantageous. In this setting, distributed servers (not shown) may each contain only one application/system/module with the remainder of the applications/systems/modules resident on a centrally located server. In another embodiment, a number of servers may be present in a central location, each having different software applications resident therein. Alternatively, a number of servers may reside in a central location, each containing all of the systems/modules resident therein. A server computer typically comprises an advanced mid-range multiprocessor-based server, such as the RS6000 from IBM, utilizing standard operating systems, software written in C++, Java or a similar language, which is designed to drive the operation of the particular hardware and which is compatible with other system components, and I/O controllers. A personal computer may typically comprise an INTEL PENTIUM III microprocessor, or like processor, such as found in an IBM Aptiva computer.

II. Workstation

Memory 12 of workstation 6 preferably includes a program product 20 that, when executed by CPU 14, provides various functional capabilities for workstation 6. In a preferred embodiment, program product 20 includes an authentication system 24 that conducts all authentication functions of workstation 6. In a Windows NT® setting, authentication system 24 is commonly referred to as a graphical identification and authentication dynamic link library (GINA dll). Beyond authentication functions, authentication system 24 also preferably includes: a task module loader 26 for providing instructions to workstation 6 for loading a task module 10 (FIG. 2); a task module receiver 28 for receiving instructions; and a reboot system 30. Memory 12 also preferably includes a number of applications 32 that, when executed by CPU 14, provide the diverse functional capabilities of workstation 6. In addition, memory 12 preferably includes a workstation registry 34. A requester 208 may also be resident in memory 12, as will be described below.

In the following discussion, it will be understood that the method steps discussed preferably are performed by a processor, such as CPU 14 of workstation 6, executing instructions of a program product stored in memory. It is understood that the various devices, modules, mechanisms and systems described herein may be realized in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

III. Requester or Requester System

The term "requester" as used herein includes any system or program that may instruct some activity to be conducted by workstation 6. A requester may be, for instance as shown in FIG. 1, an external (relative to workstation 6) system such as requester system 8, an external requester program 108, or may be a resident system or program 208 of workstation 6 (hereinafter cumulatively referred to as "requester"). In accordance with the invention, a requester 8, 108, 208 instructs authentication system 24 of workstation 6 what task module 10 (see FIG. 2) to load and when to activate a particular component of a task module 10. Further, in accordance with the invention, requester 8, 108, 208 may be an upgrade program or system and include upgrade code to instruct authentications system 24 to upgrade one or more of applications 32 of workstation 6. In addition, multiple task modules 10 may also be provided to workstation 6 by one or more requesters 8, 108, 208. Each task module 10 may have unique functions, i.e., upgrade, as required by a particular requester 8, 108, 208. However, in a preferred embodiment, each task module 10 will have the ability to perform core functions such as a userless logon of workstation 6 and the ability to display messages on a sign-on screen of workstation 6 with no user signed on.

IV. Task Module

Figure 2:
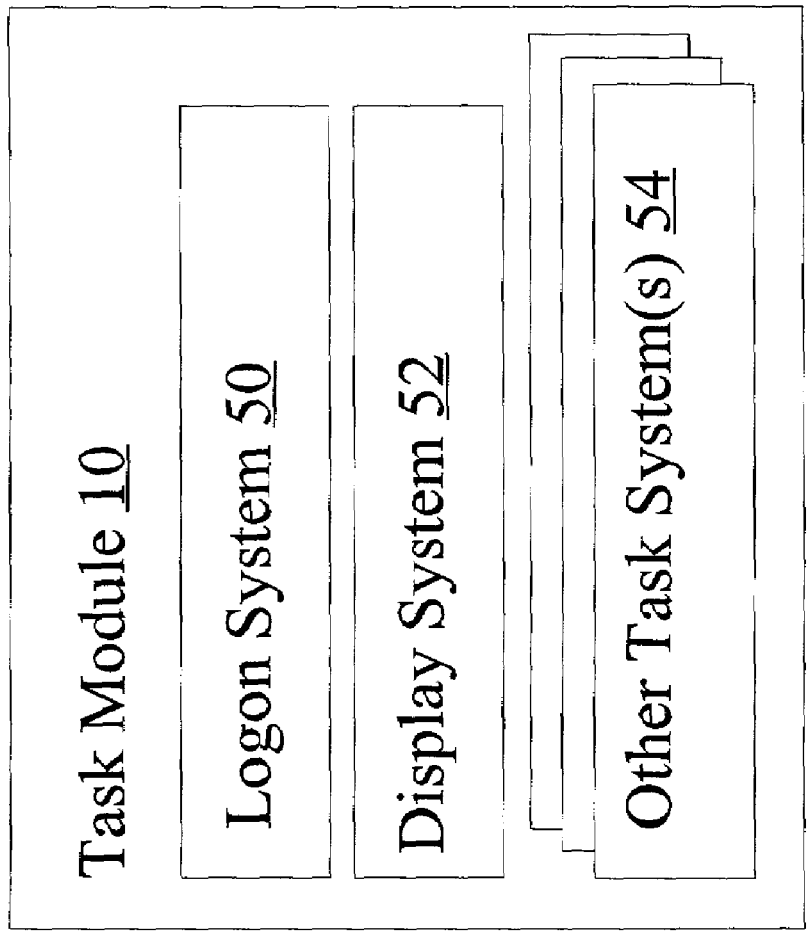
FIG. 2 is a block diagram of a task module in accordance with the invention.

Referring to FIG. 2, a task module 10 is shown that provides a number of non-authentication type tasks or functions that can be performed via authentication system 24. Task module 10 may include a number of systems including: a logon system 50, a display system 52 and other task system(s) 54. Logon system 50 and display system 52 provide special advantages relative to upgrades in that they conduct userless automatic logons and message displaying required for performing upgrades. Display system 52 may receive a response from a user of workstation 6 to messages displayed on display 19 of workstation 6. Authentication system 24 of workstation 6 may send these responses to requesters 8, 108, 208.

Task module 10 may be delivered prior to upgrades to workstation 6 or packaged with upgrades. In this way, the invention has the ability to modify authentication system 24 at runtime without requiring a reboot, thereby allowing new functions to be added to the user authentication step without interrupting other workstation activity. Task module 10 preferably takes the form of a number of dynamic link libraries (DLLs) that may be called upon to conduct tasks by authentication system 24. DLLs are advantageous because they do not take up RAM unless called upon, hence reducing the burden on memory. A requester 8, 108, 208, as will be described below, instructs task module loader 26 of authentication system 24 which task module 10 to load.

Prior to loading into authentication system 24, task module 10 may be resident in a number of locations. For instance, task module 10 may be resident on an external system to workstation 6, i.e., requester system 8 or requester program 108. In contrast, task module 10 may be resident on workstation 6 but not part of authentication system 24. In this case, task module 10 may be resident, for instance, in registry 34.

V. Operation

A. Authentication System: Task Module Loader

Much of the flexibility of the invention is its ability to allow task module 10 to be loaded on demand using task module loader 26 without interrupting other workstation 6 operations. Task module loader 26 is a code module resident in authentication system 24 of workstation 6. Authentication system (GINA) 24 of a workstation 6 does not have any knowledge of what is contained in task module 10 before it is loaded, except that there is a method to start running the code in task module 10. Task module 10 can be loaded in any fashion known to those with ordinary skill in the art. In a preferred embodiment, however, a task module 10 is loaded in one of two ways: (1) while workstation 6 is running, by instructing authentication system 24 to load it by sending an instruction through a command pipe to task module receiver 28; or (2) at boot time by adding a registry entry to registry 34 of workstation 6. As will be described below in more detail, task module loader 26 is capable of implementing either type of task module load or both task module loads simultaneously. That is, task module loader 26 can load task module 10 via a command pipe and/or via a workstation registry. Further, task module loader 26 includes the ability to load multiple task modules 10, which is advantageous, for example, when numerous upgrades are being conducted simultaneously on applications 32 of workstation 6.

Turning to FIGS. 3–6, the operation of the present invention will be described in more detail. FIG. 1 is also regularly referred to.

Figure 3:
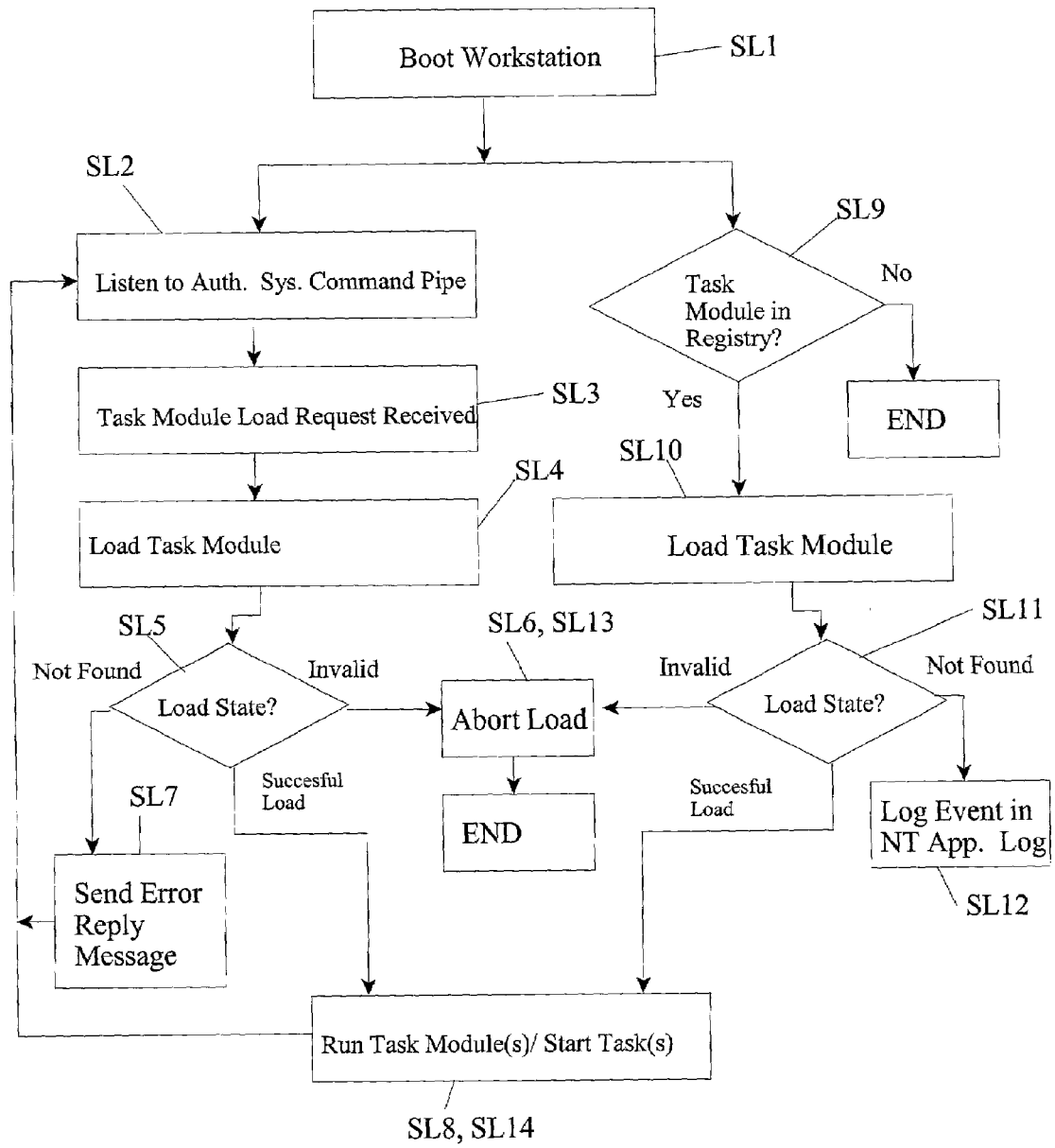
FIG. 3 is a system flow diagram depicting a loading operation of a task module of the system of FIG. 1.

Referring to FIG. 3, the logic of task module loader 26 is described. In a first step SL1, a user boots a workstation 6, i.e., turns on or re-starts a workstation. At this point, logic branches to steps SL2 and SL9 to provide two potentially simultaneous functions. Two functions are possible because as noted above, a task module 10 may be located in various locations and more than one task module 10 may be loaded at once.

In step SL2, an authentication system 24 (GINA) command pipe is listened to or polled for requests to load task module 10. That is, task module receiver 28 of authentication system 24 listens for requests to task module loader 26 to load task module 10 from a requester 8, 108, 208.

At step SL3, a task module load request/instruction is received via the command pipe from a requester 8, 108, 208. This request may come from any requester 8, 108, 208. At step SL4, task module 10 is loaded. At step SL5, task module loader 26 checks the load state to determine whether the load was successful. If the load is found invalid, the load is aborted at step SL6. If task module 10 is not found, an error reply message is sent, at step SL7, to the requester 8, 108, 208 and logic returns to step SL2 to listen for further requests coming to task module receiver 28 of authentication system 24 via the command pipe. When the load is successful, logic proceeds to step SL8 where task module 10 is run and the task(s) started.

At the same time as task module receiver 28 of authentication system 24 is monitoring a command pipe, task module loader 26 logic also proceeds with step SL9. In particular, task module loader 26 checks workstation 6 registry 34 to determine whether task module 10 is present therein. If task module 10 is not present therein, logic ends. If task module 10 is in registry 34, task module loader 26 loads task module 10 at step SL10.

At step SL11, task module loader 26 checks the load state to determine whether the load was successful. If the load is not found, a log event is placed in Windows NT® application log at step SL 12 and the process thereafter ends. If the load is found invalid, the load is aborted at step SL13 and the process thereafter ends. When the load is successful, logic proceeds to step SL14 where task module 10 is run and the task(s) started.

It should be recognized that more than one task module 10 can loaded to authentication system 24 at the same time. For example, a number of requesters 8, 108, 208 may request that several task modules 10, all having a different function, be loaded and run on workstation 6. Accordingly, task module loader 26 may load one or more task modules 10 at any given time.

B. Task Module: Logon System

Figure 4:
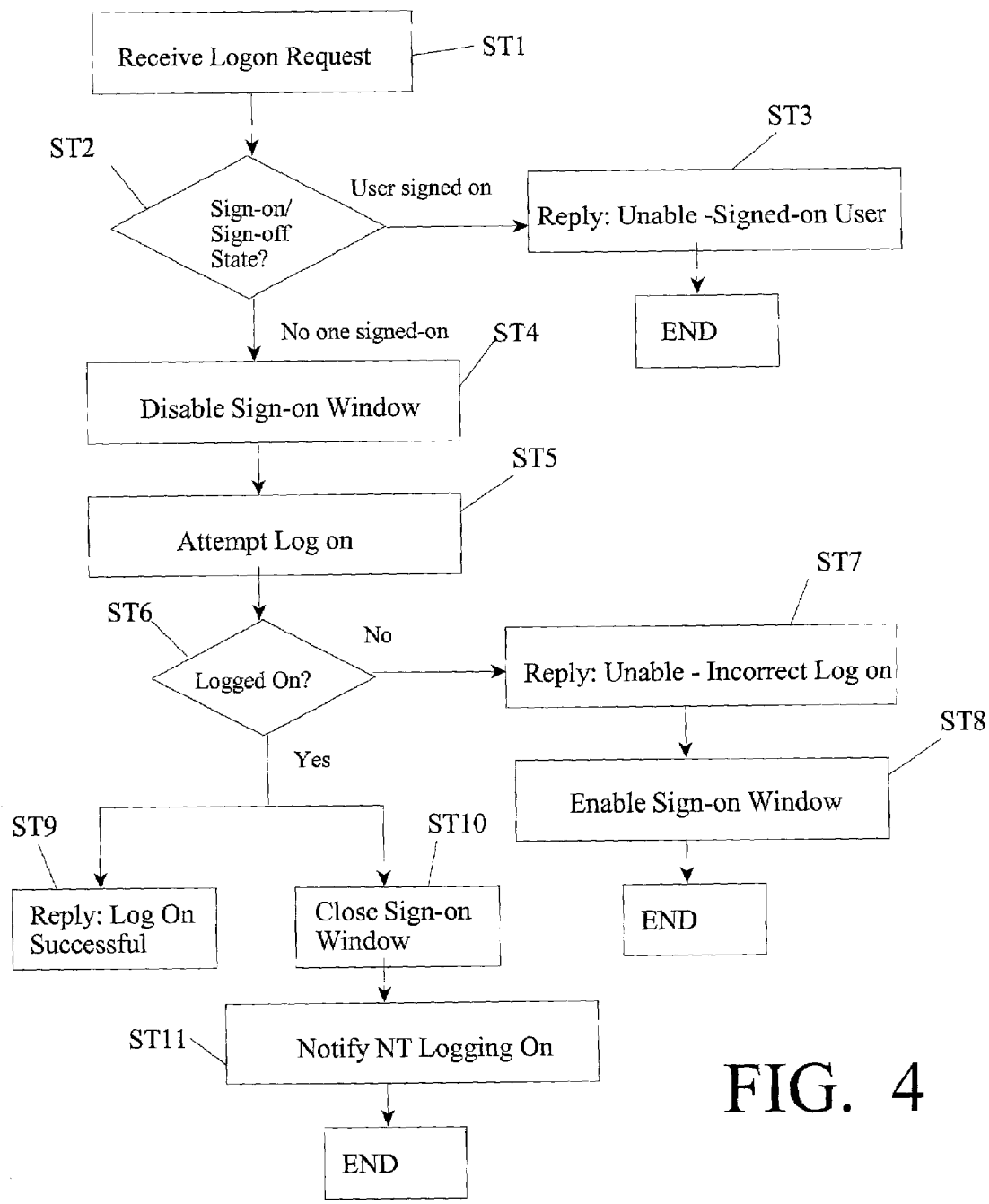
FIG. 4 is a system flow diagram depicting a userless logon operation of the task module.

Referring to FIG. 4, the process for providing a logon system 50 to perform a userless logon of workstation 6 (instead of by a user typing their identification and password) is shown. One exemplary reason for providing a userless logon is to remove the need for manual attention to complete an upgrade. Further, a userless logon allows the display of progress information relative to an upgrade and allows problem recovery should something unexpected happen during an upgrade. Under standard Windows NT® logon operation, display of messages with any flexibility can only be provided by logging on and showing a logged-on user's desktop. Task module 10 allows userless logon and display of messages from the Winlogon desktop, i.e., sign-on window, of authentication system 24 of workstation 6.

At step ST1, workstation 6 and/or authentication system 24 receive a request to have a userless logon. This request may come from any requester 8, 108, 208, as defined above. Next at step ST2, logon system 50 checks a sign-on/sign-off state of workstation 6. Where a user is found to be logged on, logon system 50 logic proceeds to step ST3 where a reply is sent to the requester indicating logon system's 50 inability to logon because of a signed-on user. At step ST4, where no user is signed-on to workstation 6, logon system 50 disables a sign-on window of workstation 6. That is, logon system 50 disables the Winlogon desktop of Windows NT® that is conventionally displayed on a workstation 6 during inoperation, non-use, etc. This sign-on window usually is a full screen window having entries for user identification, password, and perhaps information regarding stock unit and workstation 6. Hence, disabling the sign-on window makes it so a user cannot sign-on to workstation 6, which would complicate and/or prevent the ability of the requester to conduct the upgrade.

At step ST5, logon system 50 attempts to logon to workstation 6. This is accomplished by providing each logon system 50 with an exercisable identification and password which may depend on the requester function. For instance, an upgrade type requester may use an upgrade specific ID and password.

At step ST6, logon system 50 determines whether logon was successful. If logon was unsuccessful, at step ST7, logon system 50 replies to requester 8, 108, 208 with an 'unable-incorrect logon' message and, at step ST8, re-enables the Windows NT® sign-on window. Where the logon was successful, at step ST9, logon system 50 returns to requester 8, 108, 208 a reply that logon was successful, and, at step ST10 closes the Windows NT® sign-on window. At step ST11, logon system 50 notifies authentication system 24, which notifies Windows NT®, that it is logging on. That is, a return code or notification is sent to the Windows NT® Winlogon program. This notification indicates to Windows NT® that logon system 50 is logged on and instructs Windows NT® to switch desktops to a logon user desktop.

Once logon system 50 is successful, other operations and task module 10 functions may be activated. It should be recognized that a particular task module 10 need not include a logon system 50. This may be the case where, for example, other non-authentication tasks not requiring userless logon are desired. When requester activity is complete, e.g., when an upgrade is complete, preferably, task module 10 is removed to free memory in workstation 6.

C. Task Module: Display System

Figure 5:
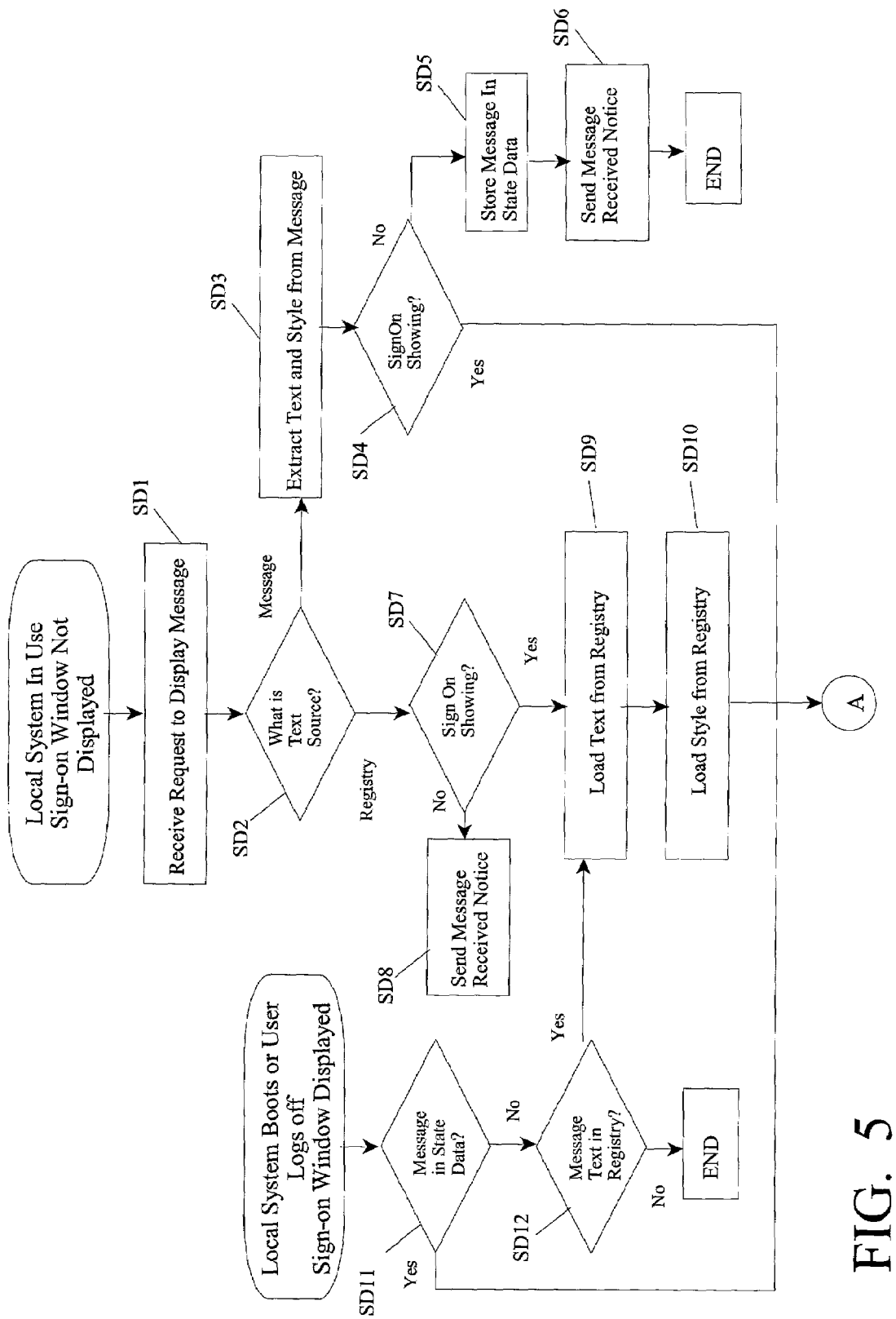
FIGS. 5–6 are system flow diagrams depicting message display operations of the task module.

Referring to FIG. 5, logic for a display system 52 of task module 10 is described. Display system 52 provides a mechanism by which messages may be displayed on the logon screen whenever a user is not signed-on to workstation 6. In accordance with the invention, messages may take a variety of forms, from simple message lines to those requiring user response.

Messages may either be stored in an operating system registry, as state data of workstation 6 to give them a degree of permanence, or be sent via a command pipe to workstation 6. Messages stored in registry 34 or as state data may be those that are used often by workstation 6 or are used relative to special events. An example of such a message may be one used when an upgrade is scheduled for a couple of days in the future. Since this type message may be used repeatedly, the message may be stored in registry 34 for easy access by a task module 10 that requires it. When a task module 10 that uses the message is initially loaded, the message may also be added to registry 34 or state data so it can be used even if workstation 6 is rebooted. A message required to warn the user of an imminent upgrade would also be added to registry 35 or state data. The message could then be displayed on a sign-on screen all the time, even if workstation 6 is rebooted.

A single use type of message may be used, for example, where an upgrade is going to start in a few minutes. In this case, a message could be sent via the command pipe to display an interactive message box on display 19 warning a user that the upgrade is going to happen. If the user presses a button on the message, requester 8, 108, 208 would be notified that the user acknowledged the message. It should be understood that the above exemplary uses for messages are only a couple of possibilities for sign-on screen messaging. The message displaying capabilities of the present invention should not be limited to any particular type of message.

Display system 52 logic may begin in two different fashions depending on a status of workstation 6. Where workstation 6 is being booted or if a user just signed off, display system 52 logic begins at step SD 11 (left side of FIG. 5). Where workstation 6 is in use, display system 52 logic begins at step SD1 (center of FIG. 5). At step SD1, display system 52 receives a request to display a message from a requester 8, 108, 208, e.g., through a command pipe.

At step SD2, display system 52 determines where the requested message is stored. Two possibilities exist. First, the message text may be found in the request, i.e., the request includes the message. Second, the message text may be stored in registry 34 of workstation 6, e.g., for frequently used messages.

Where the message text is determined to be in the request itself, at step SD3, the message text is extracted from the message. Next, at step SD4, display system 52 determines whether the sign-on window is showing. If the sign-on window is showing, it indicates that a user is not signed on and display system 52 logic proceeds to step SD13 (FIG. 6), discussed below. If the sign-on window is not showing, it indicates that a user is signed on and display system 52 logic proceeds to step SD5. At this step, the message is stored in state data of workstation 6. Subsequently, when the user signs off, the message can be displayed, as described relative to steps SD11–SD12 below. At step SD6, a notice is sent to requester 8, 108, 208 that the message was received successfully and will be displayed, e.g., when the user signs off.

Where the message text is determined to be in registry 34, display system 52 logic proceeds to step SD7, where display system 52 determines whether the sign-on window is showing. If the sign-on window is not showing, it indicates that a user is signed on and logic proceeds to step SD8. At this point, a notice is sent to requester 8, 108, 208 indicating that the message was received. The message would then be displayed when the user signs off, as described relative to steps SD11–SD12 below. If the sign-on window is showing, it indicates that a user is not signed on and logic proceeds to step SD9 where the text is loaded from the registry. At step SD 10, the message style is loaded from the registry. Logic then proceeds to step SD 13 (FIG. 6), described below.

As noted above, when workstation 6 is being booted or if a user just signed off, display system 52 logic begins at step SD11 (left side of FIG. 5). In this case, a sign-on window will be displayed on display 19. At step SD11, display system 52 checks state data for presence of a message. An example of when a message may be stored in state data may be where a 'Do NOT Turn Off this Machine' message needs to be displayed after a user signs off workstation 6. This may be required where workstation 6 is scheduled for an upgrade in the near future. Rather than display this message during use, the message is saved in state data until the user signs off, at which point it is displayed to prevent the user or any subsequent user from turning the machine off. Similarly, certain messages may be useful when a user boots workstation 6. These messages may also be saved in state data for use when workstation 6 is booted by a user.

If a message is not found in workstation 6 state data, at step SD 12, display system 52 determines whether a message is present in registry 34 of workstation 6. That is, if a message for use relative to user sign off, or workstation 6 booting, is not stored in the state data of workstation 6, it may be present in registry 34 of workstation 6. If a message is not in registry 34, display system 52 logic ends. In this case, there is no message to display. If a message is found in registry 34, display system 52 logic proceeds to step SD9 and SD10 where the message text and style is loaded from the registry, as explained above.

Figure 6:
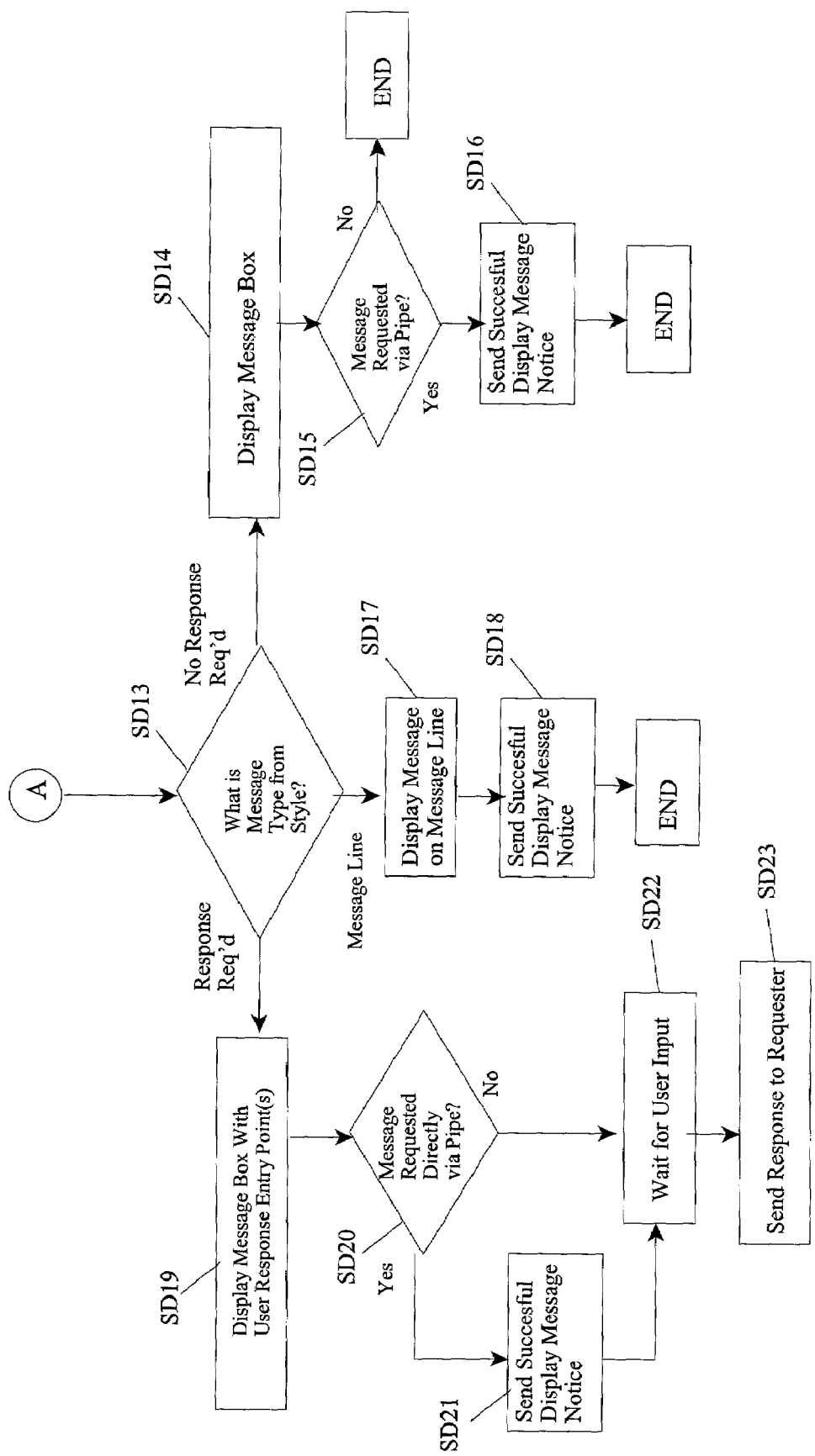

Returning to step SD11, where the message is found in workstation 6 state data, display system 52 logic proceeds to step SD13, shown in FIG. 6. At step SD 13, display system 52 determines the message type from its style. Three types of messages are possible: (1) message box with no user response required; (2) message line only; and (3) message box with user response requested or required.

Where step SD13 determines that the message is of the type where no user response is required, display system 52 logic proceeds to step SD14 where the message is displayed. In this case, a message box having some text, but no place for a user response (excepting perhaps an 'OK' button to dismiss the message) is displayed on display 19. An example of this type message may be a message box containing the text: 'An Upgrade Of This System Is Scheduled For December 8.' Next, at step SD15, display system 52 determines whether the message was sent via a command pipe. If the message was not sent via a command pipe, display system 52 logic ends. If the message was sent via a command pipe, at step SD16, a notice that the message was displayed successfully is sent to the appropriate requester, e.g., via the command pipe. Display system 52 logic then ends.

Where step SD 13 determines that the message is of the type where only a message line is required, at step SD17, the message line is displayed. A message line type message is a line of text that may appear, for example, at the top of the screen. Generally, this type message is used for non-critical information such as a status update, e.g., 'Upgrade Scheduled For 4 am.' Next, at step SD18, a notice that the message line was displayed successfully is sent to the requester, e.g., via the command pipe. Display system 52 logic then ends.

Where the determination at step SD 13 determines that the message is of the type where a user response is required, at step SD 19, the message is displayed with at least one user response entry point(s). An entry point may be a simple 'OK' button or may be more involved. For example, this type message may notify a user: 'An Update Is About To Occur, Are You Sure You Want To Sign-on?' The user may then be able to select between 'Yes' and 'No'. In response to a user responding 'Yes', requester 8, 108, 208 may respond with another message, e.g., 'Update Will Be Postponed 3 Days'. A user responding 'No' may start the upgrade or other activity immediately. A user response could also be queried to enter a time when the workstation 6 would not be in use. Practically any manner of user response may be obtained in this fashion.

Next, at step SD20, display system 52 determines whether the message was requested directly via a command pipe. If the message was requested directly via a command pipe, it means that the message was displayed when the sign-on screen was displayed as a consequence of a message being present either in registry 34 or workstation 6 state data. If this is the case, at step SD21, a notice that the message was displayed successfully is sent to the appropriate requester, e.g., via the command pipe. Display system 52 logic then proceeds to step SD22. If display system 52 determines the message was not directly requested via a command pipe this means that the sign-on screen was showing and a message was received that instructed display system 52 to display the message contained within the message or display the message stored in registry 34. In this case, display system 52 logic proceeds to step SD22. At step SD22, display system 52 waits for user input.

At step SD23, when a user responds, the response is sent to the appropriate requester. Hence, display system 52 of task module 10 provides a mechanism by which a requester 8, 108, 208 can provide information to workstation 6 even when the workstation is not in use. In addition, display system 52 provides for collection of practically any information from a user about workstation 6. As a result, more efficient upgrades may be performed.

Figure 7:
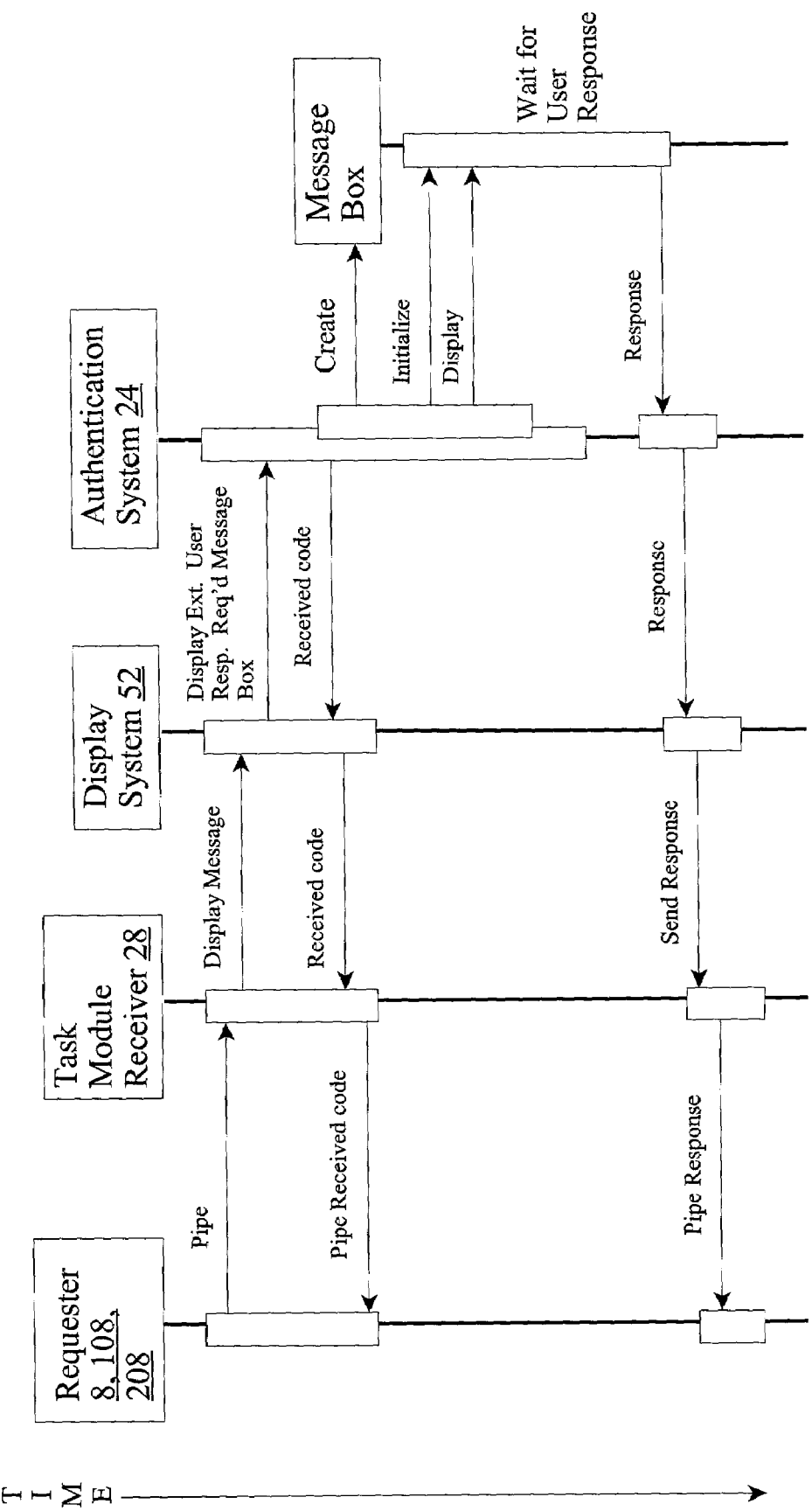
FIG. 7 is a timeline for message displaying.

Referring to FIG. 7 a message display timeline for a message box requiring user response is shown. In the figure, time runs vertically downward and the blocks below each component indicate active periods. As shown, information from a requester 8, 108, 208 may be received initially by task module receiver 28.

D. Task Module: Other System(s)

As mentioned above, task module 10 may include other system(s) 54 that provide non-authentication tasks for workstation 6 via authentication system 24. Practically any manner of non-authentication task now known or later developed may be conducted via authentication system 24. Examples may include: audibly announcing an upgrade, providing real-time upgrade status, etc.

E. Authentication System: Reboot System

Returning to FIG. 1, reboot system 30 of authentication system 24 provides for an automatic reboot of workstation 6. Such an operation may be required for updating of workstation 6 registry 34 after an upgrade's completion. Reboot system may be activated by instruction from requester 8, 108, 208.

VI. Exemplary Use

One use, as discussed above, is providing upgrades to workstation 6. For each upgrade, a customized task module 10 may be loaded to workstation 6. Task module 10 may then be remotely instructed to logon so the upgrade can occur. Prior to, during and after upgrade activity, the upgrade can request messages be sent to workstation 6. As discussed above, task module 10 can determine whether workstation 6 is in use so that the appropriate channels for delivering messages can be determined. If workstation 6 is not in use, task module 10 allows userless logon of workstation 6 and appropriate messages to be displayed as instructed by a requester 8, 108, 208. Where the upgrade requires workstation 6 to be re-booted to activate new or upgraded functions, task module 10 may be instructed to activate reboot system 30 of authentication system 24. When the upgrade is complete, its respective task module 10 is preferably removed to clear memory in workstation 6.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of conducting non-authentication tasks using an authentication system of a workstation, comprising the steps of:

loading a task module to the authentication system of the workstation;

conducting a non-authentication task using the task module; and modifying the authentication system during the conducting step without requiring a reboot.

2. The method of claim 1, wherein the step of conducting a non-authentication task includes:

logging onto the workstation using the task module as requested by an upgrade; and automatically upgrading an application on the workstation.

3. The method of claim 2, further comprising the step of displaying a message indicating an upgrade status.

4. The method of claim 3, further comprising the step of sending a response to the message to the upgrade from a user of the workstation.

5. The method of claim 2, wherein the step of logging on to the workstation occurs without user interaction.

6. The method of claim 1, further comprising the step of removing the task module when the non-authentication task is complete.

7. The method of claim 1, wherein the step of conducting the non-authentication task includes displaying a message from a requester.

8. The method of claim 7, further comprising the step of sending a response to the message to the requester from a user of the workstation.

9. The method of claim 1, wherein the step of conducting the non-authentication task includes logging onto the workstation using the task module as requested by a requester.

10. The method of claim 1, wherein the loading step includes a requester instructing a task module loader of the authentication system to load the task module.

11. The method of claim 10, wherein the task module is in a workstation registry.

12. The method of claim 10, wherein the task module is delivered via a command pipe.

13. The method of claim 1, wherein the step of loading occurs without interrupting workstation operation.

14. The method of claim 1, wherein the authentication system comprises a graphical identification and authentication dynamic link library.

15. A computer program product comprising a computer useable medium having computer readable program code embodied therein for using an authentication system of a workstation to conduct a non-authentication task, the computer program product comprising:

a task module configured to conduct a non-authentication task using the authentication system and including a logon system configured to conduct a userless logon of the workstation; and a task module loader configured to load the task module to the authentication system or the workstation.

16. The computer program product of claim 15, wherein the task module loader is stored in the authentication system of the workstation.

17. The computer program product of claim 16, wherein the task module is loadable from a registry of the workstation.

18. The computer program product of claim 16, wherein the task module is loadable from an external requester.

19. The computer program product of claim 16, further comprising a request receiver configured to receive a request to load the task module from a requester.

20. The computer program product of claim 16, 18, wherein the task module includes a display system configured to display a message on a sign-on screen of the workstation.

21. The computer program product of claim 20, wherein the display system is further configured to send a response to a message from a workstation user to a requester.

22. An apparatus for conducting non-authentication tasks using an authentication system of a workstation, the apparatus comprising:
- a task module configured to conduct a non-authentication task using the authentication system and including a logon system configured to conduct a userless logon of the workstation;
- a task module loader resident in the authentication system configured to load the task module; and
- a requester configured to instruct the task module loader to load the task module and to instruct the authentication system how to activate the task module.

23. The apparatus of claim 22, wherein the requester is one of an upgrade system and an upgrade program.

24. The apparatus of claim 22, wherein the requester is external to the workstation.

25. A workstation comprising:
- a processor; and
- memory, having a software program stored therein, and executable by the processor, the software program including:
    - an authentication system;
    - a task module configured to conduct a non-authentication task using the authentication system and including a logon system configured to conduct a userless logon of the workstation;
    - a task module loader resident in the authentication system configured to load the task module; and
    - a requester configured to instruct the task module loader to load the task module and to instruct the authentication system bow to activate the task module.

* * * * *

UNITED STATES PATENT AND TRADEMARK OFFICE
CERTIFICATE OF CORRECTION

PATENT NO. : 6,981,277 B1
DATED : December 27, 2005
INVENTOR(S) : Dylan Smith

It is certified that error appears in the above-identified patent and that said Letters Patent is hereby corrected as shown below:

Column 12,
Line 54, delete "or" and insert -- of --.

Column 13,
Line 1, delete "18".

Column 14,
Line 17, delete "bow" and insert -- how --.

Signed and Sealed this

Twenty-eighth Day of March, 2006

JON W. DUDAS
*Director of the United States Patent and Trademark Office*